United States Patent [19]

Holtgraver

[11] Patent Number: 5,538,029
[45] Date of Patent: Jul. 23, 1996

[54] METHOD FOR ADJUSTING VALVE SEALING ENGAGEMENT

[75] Inventor: Edward G. Holtgraver, Aurora, Ill.

[73] Assignee: Henry Pratt Company, Aurora, Ill.

[21] Appl. No.: 422,817

[22] Filed: Apr. 17, 1995

[51] Int. Cl.$^6$ .............. F16K 25/00; F16K 1/22
[52] U.S. Cl. .............. 137/15; 251/173; 251/306; 251/307
[58] Field of Search ............ 137/15, 246, 246.22, 137/315; 251/173, 306, 307

[56] References Cited

U.S. PATENT DOCUMENTS

| | | | |
|---|---|---|---|
| 2,965,354 | 12/1960 | Grove et al. | 251/173 |
| 3,304,050 | 2/1967 | Fawkes | 251/306 |
| 3,394,914 | 7/1968 | Nagasato | 251/173 |
| 3,399,863 | 9/1968 | Fawkes | 251/306 |
| 3,410,520 | 11/1968 | Mahoney | 251/307 |
| 3,447,781 | 6/1969 | Fawkes | 251/315 |
| 3,540,696 | 11/1970 | Fawkes | 251/306 |
| 3,544,066 | 12/1970 | Fawkes | 251/306 |
| 3,584,641 | 6/1971 | Milleville | 137/246.22 |
| 3,620,243 | 11/1971 | Zatopek et al. | 137/246.22 |
| 3,656,498 | 4/1972 | Grove et al. | 137/246.22 |
| 3,837,616 | 9/1974 | Castriota-Scanderbeg | 251/306 |
| 3,958,314 | 5/1976 | Kurijian, Jr. | 29/157 |
| 4,138,090 | 2/1979 | Sumner et al. | 251/306 |
| 4,540,457 | 9/1985 | LaValley | 156/182 |
| 5,069,240 | 12/1991 | Kurjian, Jr. | 137/15 |

FOREIGN PATENT DOCUMENTS

| | | | |
|---|---|---|---|
| 1500181 | 10/1969 | Germany | 251/173 |

*Primary Examiner*—George L. Walton
*Attorney, Agent, or Firm*—Fish & Richardson

[57] ABSTRACT

A method for adjusting sealing engagement of a valve seat includes providing a valve with a disk in a flow passageway and a valve seal with a seat positioned for sealing engagement with the disk, the valve body and seal together defining a channel having a seal surface lubricated to resist adhesion of the surface and polymeric material, the valve body defining a passage for external access to the channel; injecting liquid polymeric material through the passage into the channel, the polymeric material in the channel pressuring the valve seat toward sealing engagement with the disk; allowing the polymeric material to harden; producing a tunnel through the hardened polymeric material from an external port to the lubricated surface of the seal; and injecting liquid polymeric material under pressure through the tunnel into the channel and causing the liquid polymeric material to flow along the lubricated surface of the seal to collect in selected regions to improve sealing engagement of the seat with the disk.

3 Claims, 2 Drawing Sheets

5,538,029

METHOD FOR ADJUSTING VALVE SEALING ENGAGEMENT

BACKGROUND OF THE INVENTION

This invention relates to valve seals and methods of adjusting valve seals.

Most butterfly valve seals are made of elastomeric materials which are flexible and resilient, and which create an interference engagement with a valve disc to effect a leak-free seal. Generally, the elastomeric seals in small butterfly valves are dimensionally fixed and they allow no adjustment of the amount of interference between the seal and disc. Larger butterfly valves normally offer an ability to adjust this interference so as to overcome the larger tolerance deviations likely in large components. The most common means of adjustment of the seal is achieved through the action of a compression ring. This ring mechanically squeezes the seal increasing the interference between the seal and disc.

Other methods of adjusting the amount of interference between the seal and disc are described in U.S. Pat. Nos. 3,304,050, 3,540,696, 3,544,066 and 3,958,314.

SUMMARY OF THE INVENTION

According to one aspect of the invention, a method of adjusting sealing engagement of a valve seat in a valve comprises the steps of: providing a valve body having a wall defining a flow passageway, a valve disk disposed within the flow passageway, and a valve seal mounted upon the wall and defining a valve seat positioned for sealing interference engagement about an opposed surface of the valve disk, the wall of the valve body and an opposed surface of the valve seal defining a channel therebetween, the surface of the valve seal defining the channel having a coating of lubricating material resisting adhesion between the surface and polymeric material in the channel, the valve body defining a passage for access to the channel from external the valve body, the passage having a first, outer end terminating at an external port and a second, inner end communicating with the channel, the method comprising the further steps of: injecting a liquid polymeric material through the passage into the channel, the polymeric material in the channel acting to pressure the valve seat radially inwardly toward sealing engagement with the valve disk; allowing the polymeric material to harden; producing a tunnel through the hardened polymeric material to extend from the external port through the passage to the lubricated surface of the valve seal; and injecting fluid under pressure through the tunnel into the channel and causing the fluid to flow along the lubricated surface of the valve seal and collect in selected regions for improving sealing engagement of the seat surface against the valve disk.

Preferred embodiments of this aspect of the invention may include the following additional steps: maintaining the valve under flow pressure during the step of injecting fluid under pressure for improving sealing engagement, monitoring the sealing performance during injection of the fluid under pressure for improving sealing engagement, and discontinuing injection of fluid under pressure when predetermined minimum sealing engagement performance is detected. The fluid is a hardenable liquid polymeric material.

According to another aspect of the invention, a valve comprises a valve body having a wall defining a flow passageway, a valve disk disposed within the flow passageway, and a valve seal mounted upon the wall and defining a valve seat positioned for sealing interference engagement about an opposed surface of the valve disk, the wall of the valve body and an opposed surface of the valve seal defining a channel therebetween, the surface of the valve seal defining the channel having a coating of lubricating material resisting adhesion between the surface and polymeric material in the channel, the valve body defining a passage for access to the channel from external the valve body, the passage having a first, outer end terminating at an external port and a second, inner end communicating with the channel, the second, inner end of the passage terminating generally in alignment with a circumferential centerline of the valve seal.

Preferred embodiments of this aspect of the invention may include the passage being oriented perpendicular to the wall.

These and other features and advantages of the invention will be apparent from the following description of a presently preferred embodiment, and from the claims.

DESCRIPTION OF THE PREFERRED EMBODIMENTS

Figures 1, 1A:
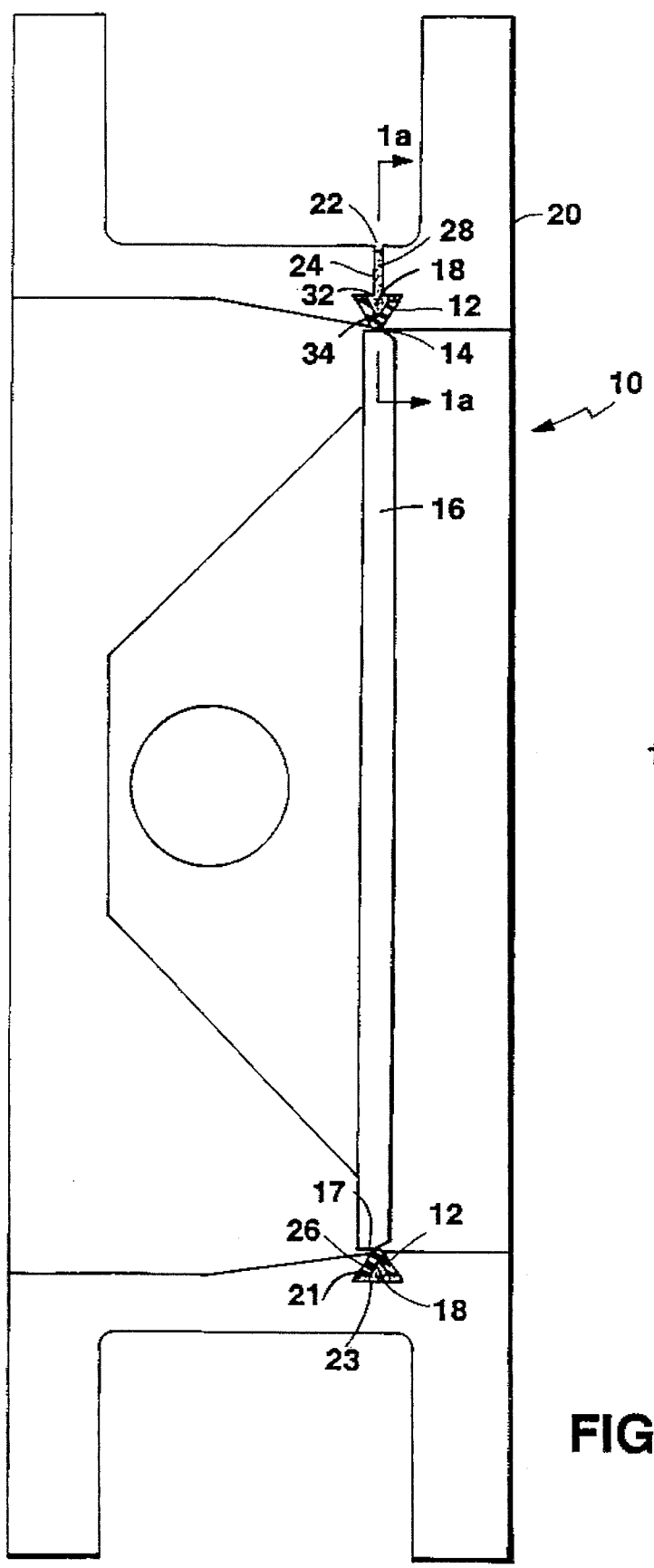
FIG. 1 is a cross-sectional view of a valve according to the present invention, with a passage for the introduction of a polymeric material behind the seal to selectively increase valve sealing engagement.
FIG. 1a is a cross-sectional view of the valve of FIG. 1 taken along lines 1a—1a of FIG. 1.

Referring to FIGS. 1 and 1a, a butterfly valve 10 has a valve body 20 containing a valve disc 16 and a valve seal 12. Valve seal 12 is located within a circumferential groove 21 in valve body 20 between a wall 23 of the valve body and a surface 17 of valve disc 16. Valve seal 12 defines a valve seat 14 for sealing engagement with valve disc 16. Valve seal 12 can be custom fit during initial installation by providing a circumferential channel 18 behind the valve seal, i.e., between the valve seal 12 and the valve body 20, into which a liquid polymeric material, e.g., epoxy, is injected under pressure to urge valve seat 14 inwardly, toward sealing engagement with valve disc 16. An external port 22 is provided to allow access to channel 18 from outside valve 10 via passage 24.

To facilitate selective increase of interference engagement of the valve seal with the valve disk, i.e. for adjustment of the fit, e.g. after wear or during repairs, surface 26 of valve seal 12 is pre-treated with a lubricant coating, e.g., any silicon based lubricant, to resist adhesion between the opposed surfaces of the valve seal and the hardened epoxy. A fluid, e.g., liquid epoxy, can then be injected behind the valve seal, at the interface between valve seal 12 and solidified epoxy 28, to selectively increase the sealing interference engagement of the valve seat 14 with the opposed surface of the valve disk 16.

Figure 2:
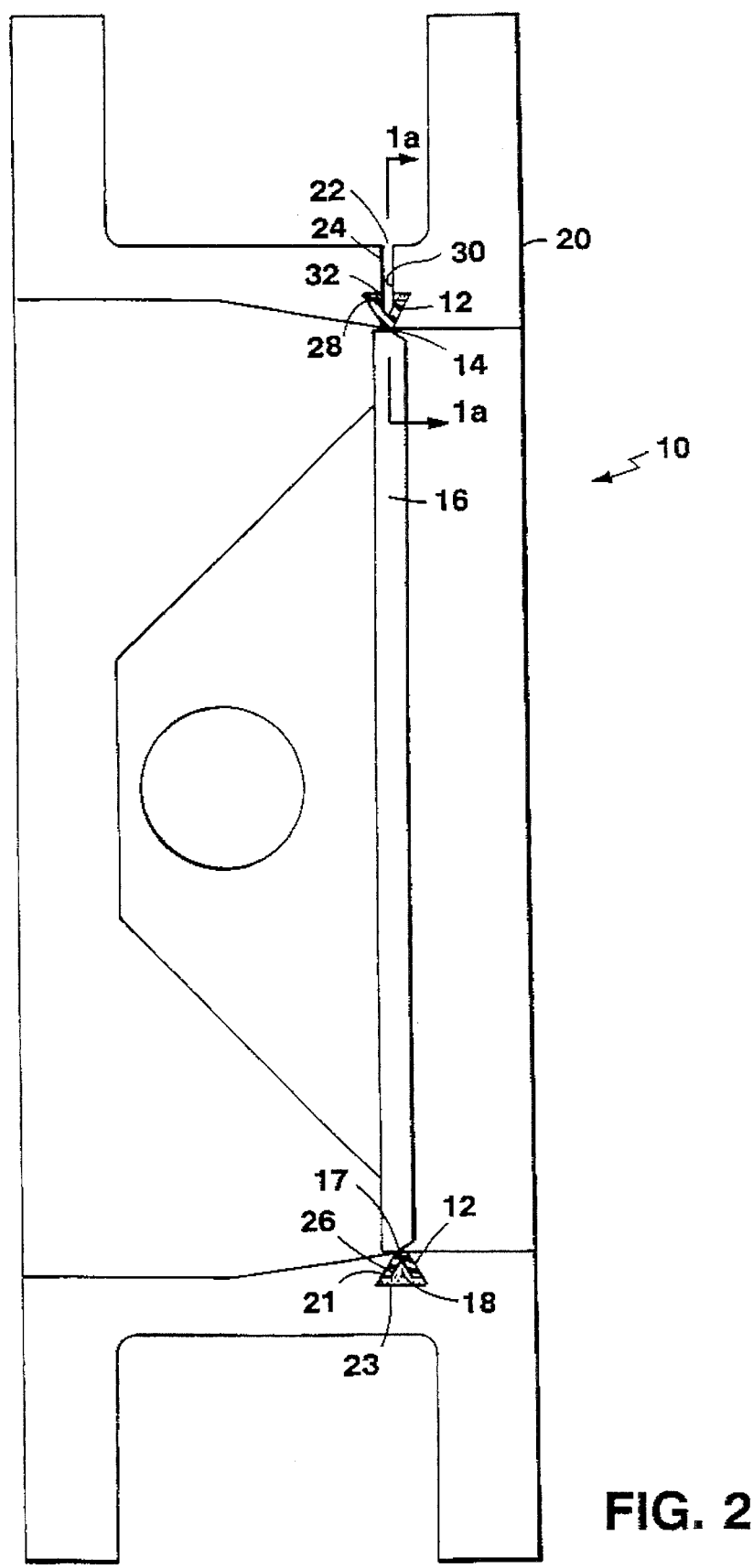
FIG. 2 is a similar view of the valve of FIG. 1, with a tunnel formed through the hardened polymeric material in the passage for adjustment of the valve sealing engagement by selective introduction of polymeric material behind the valve seal.

Referring now to FIG. 2, to access the interface between valve seal 12 and solidified epoxy 28 from external of valve 10, solidified epoxy 28 in passageway 24 is removed, e.g. by drilling, to create a tunnel 30 through the hardened epoxy, leading from port 22 to a region of lubricated surface 26. The liquid epoxy under pressure is injected through tunnel 30 to the interface, where a combination of the lubricated surface 26 behind the valve seal 12, which prevents adhesion between the opposed surfaces of the valve seal and the hardened epoxy in channel 18, and the resilient nature of the material of the valve seal 12, allows the liquid epoxy injected through tunnel 30 to pass along the interface between valve seal 12 and the hardened original epoxy 28. The liquid epoxy flows along the interface to be distributed selectively, i.e. by resilient recovery of the valve seal acting against injection pressure, at locations of relatively lesser interference engagement (compared to engagement in other regions about the valve disk) between the valve seat 14 and valve disc 16. Additional epoxy collects at these locations, while application of injection pressure at the external port 22 expands the resilient valve seal 12 to urge the valve seat 14 toward more uniform interference engagement about the opposed surface of the valve disc 16 in these regions.

In the preferred embodiment, passage 24 is oriented perpendicular to wall 23 of valve body 20, as shown in the figures. Passage 24 may also approach wall 23 at an angle other than 90°. In either case, the distal end 32 of passage 24 is generally aligned with the center portion 34 of seal 12 to allow injected epoxy to initially contact lubricated surface 26 generally at center portion 34.

Valve 10 can be maintained under flow pressure during injection of liquid epoxy to increase the valve seal engagement. Valve seal effectiveness is then monitored during the adjustment process of the invention, with flow of the liquid epoxy and/or application of the injection pressure adjusted until it is determined that the desired seal has been achieved. As a result, increase in valve seal interference engagement beyond a level required for desired valve performance is avoided, thereby holding operating torque as low as possible and maximizing valve seal life.

Also, higher pressure service capabilities can be obtained by injection of liquid epoxy at higher pressure to create additional interference engagement between valve seat 14 and valve disc 16.

In an alternative embodiment of the invention, after solidified epoxy 28 in passageway 24 has been removed, a material which remains fluid, e.g. a gas or a non-hardenable, non-compressible liquid such as hydraulic fluid, may be injected and held under constant pressure or held under pressure only when a seal is required, e.g., when a leak condition is detected, controlled by valving (not shown). The fluid is injected through tunnel 30 to the interface and passes along the interface between valve seal 12 and the hardened original epoxy 28 to adjust the sealing engagement of valve seat 14.

The method of the invention allows valve seal engagement to be selectively increased from outside of the valve body while the valve remains in service and under pressure. Among other advantages, this permits adjustment of valves that leak on test while the valve remains in the test rig and under full test pressure.

This compares most favorably with prior art procedures requiring complete disassembly of the valve, chiseling out solidified epoxy and re-injection of liquid epoxy, all without assurance that the valve will have an acceptable seal the second time around. This prior art process often requires at least a full day for completion, due to the cure time of the fresh epoxy, while the selective adjust method of the invention can require only minutes.

The method of the invention also compares favorably with another method for valves accessible from within. According to this method, where liquid epoxy is injected into the region between the valve seal 12 and the hardened epoxy 28 using a hypodermic needle inserted through the seal from within the valve body to inject additional epoxy between lubricated surface 24 and the hardened epoxy 28 in channel 18. However, in order to adjust the valve seal 12 from within the pipeline, the piping must first be drained of water, and the success of the adjustment is not known until the line is again pressurized.

These and other embodiments of the invention are within the following claims.

What is claimed is:

1. A method of adjusting sealing engagement of a valve seat in a valve, said method comprising the steps of:
providing a valve comprising a valve body having a wall defining a flow passageway, a valve disk disposed within said flow passageway, and a valve seal mounted upon said wall and defining a valve seat positioned for sealing interference engagement about an opposed surface of said valve disk, said wall of said valve body and an opposed surface of said valve seal defining a channel therebetween, said surface of said valve seal defining said channel having a coating of lubricating material resisting adhesion between said surface and polymeric material in said channel, said valve body defining a passage for access to said channel from external said valve body, said passage having a first, outer end terminating at an external port and a second, inner end communicating with said channel;

said method comprising the further steps of:
injecting a liquid polymeric material through said passage into said channel, the polymeric material in said channel acting to pressure said valve seat radially inwardly toward sealing engagement with said valve disk;
allowing the polymeric material to harden;
removing at least a portion of said hardened polymeric material located in said passage, thereby producing a tunnel through said hardened polymeric material extending from said external port, through said passage, to the lubricated surface of said valve seal; and
injecting a fluid under pressure through said tunnel into said channel and causing the fluid to flow along the lubricated surface of said valve seal and collect in selected regions for improving sealing engagement of said seat surface against said valve disk.

2. The method of claim 1 comprising the further steps of:
maintaining said valve under flow pressure during the step of injecting fluid under pressure for improving sealing engagement,
monitoring the sealing performance during injection of the fluid under pressure for improving sealing engagement, and
discontinuing injection of fluid under pressure when predetermined minimum sealing engagement performance is detected.

3. The method of claim 1 wherein said fluid is a hardenable liquid polymeric material.

* * * * *